United States Patent [19]

Lee

[11] Patent Number: 5,732,666
[45] Date of Patent: Mar. 31, 1998

[54] DEVICE FOR MOVING A RADIATOR GRILLE IN AN AUTOMOBILE

[75] Inventor: Byung-Cheon Lee, Kyungkido, Rep. of Korea

[73] Assignee: Hyundai Motor Company, Seoul, Rep. of Korea

[21] Appl. No.: 777,758

[22] Filed: Dec. 30, 1996

[30] Foreign Application Priority Data

Jun. 11, 1996 [KR] Rep. of Korea ............... 96-20780

[51] Int. Cl.$^6$ .............................................. F01P 7/02
[52] U.S. Cl. ........................................ 123/41.05; 165/98
[58] Field of Search ............... 123/41.04, 41.05, 123/41.06; 165/98, DIG. 93, DIG. 97, DIG. 99

[56] References Cited

U.S. PATENT DOCUMENTS

| | | | |
|---|---|---|---|
| 1,996,881 | 4/1935 | Royer | 123/41.05 |
| 4,539,944 | 9/1985 | Garcea et al. | 123/41.06 |
| 4,779,577 | 10/1988 | Ritter et al. | 123/41.05 |

*Primary Examiner*—Noah P. Kamen
*Attorney, Agent, or Firm*—Finnegan, Henderson, Farabow, Garrett & Dunner, L.L.P.

[57] ABSTRACT

A device for moving a radiator grille in automobiles is disclosed. In the device, a plurality of temperature sensors are placed in back of a radiator. The radiator grille has a plurality of directional control fins which are rotatable within a predetermined rotating angle by a fin moving means. The fin moving means is operated under the control of a control unit. The control unit outputs a control signal to the fin moving means in response to temperature signals from the sensors. The fin moving means rapidly moves the directional control fins under the control of the control unit in accordance with a temperature difference on the back surface of the radiator, thus controlling the flowing direction of air guided to the radiator. The radiator grille moving device of this invention improves the cooling effect of the radiator and improves durability of the parts, such as, an engine, arranged in back of the radiator.

4 Claims, 2 Drawing Sheets

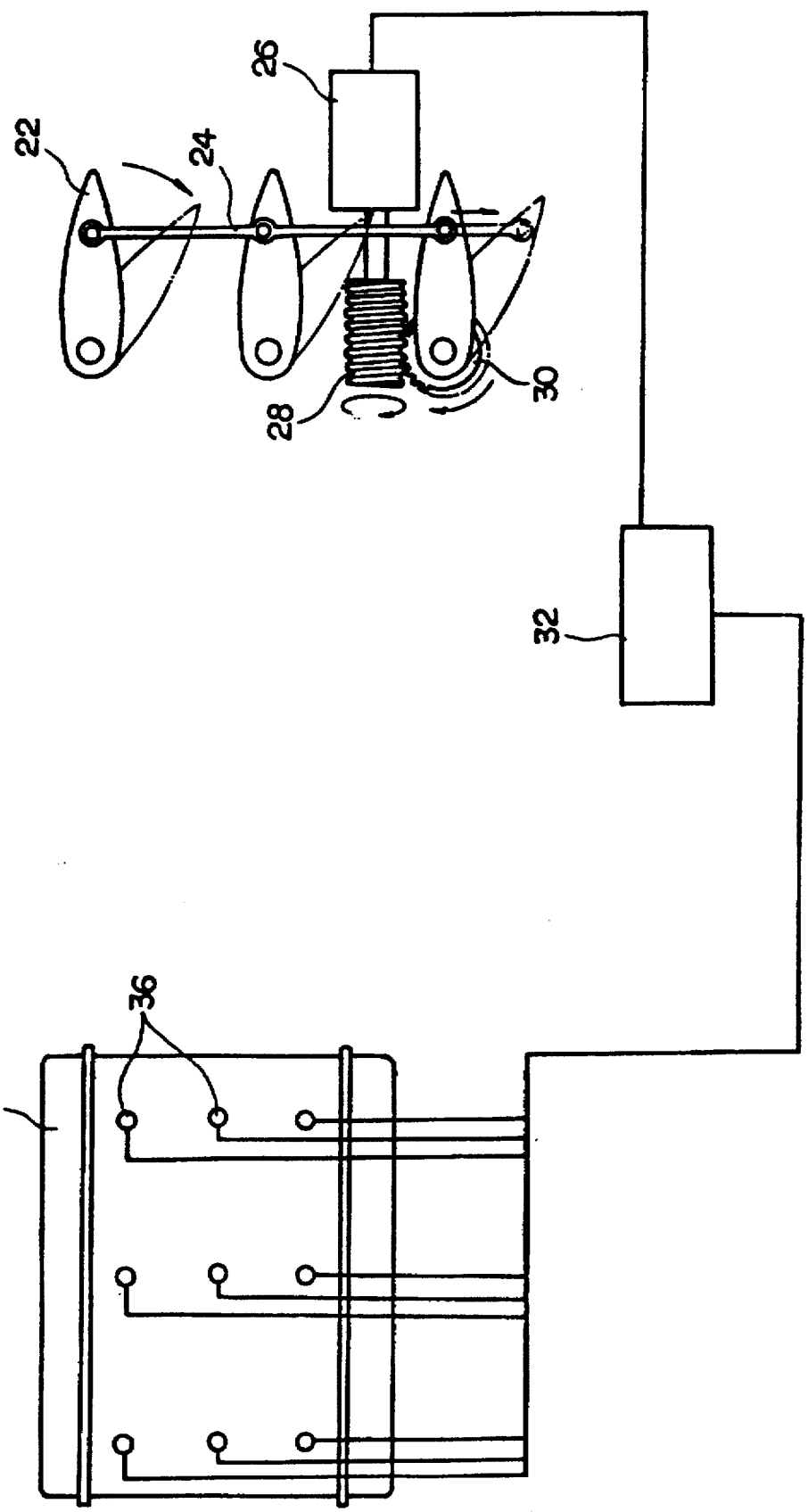

5,732,666

DEVICE FOR MOVING A RADIATOR GRILLE IN AN AUTOMOBILE

BACKGROUND OF THE INVENTION

1. Field of the Invention

The present invention relates, in general, to a device for moving a radiator grille in automobiles and, more particularly, to a radiator grille moving device for appropriately controlling the flowing direction of air in accordance with a temperature difference on the back surface of the radiator, thereby uniformly distributing the back pressure of the radiator on the front surface of the radiator.

2. Description of the Prior Art

As well known to those skilled in the art, a radiator is placed in the front section of an automobile in order to circulate liquid coolant. A radiator grille is arranged in front of the above radiator. The radiator grille forms a face of the automobile and guides air to the radiator. An automobile with a typical radiator grille is shown in FIG. 1. As shown in FIG. 1, the radiator grille is fixed in front of the radiator and uniformly guides air to all the parts of the radiator's front surface.

U.S. Pat. No. 4,539,944 discloses a system for controlling the temperature of liquid coolant in internal combustion engines.

In the above U.S. system, the temperature of the liquid coolant in the outlet conduit from the cylinder block is sensed by a plurality of temperature sensing members. The sensing members output temperature signals in order to drive a valve which controls the flow of the liquid coolant through a conduit by-passing the radiator, a vane which controls the flow of air through a port formed through the car body, and a fan which cools the radiator respectively.

However, the radiator grilles are typically designed with thought of their configurations because they are seen as pans mainly influencing the appearance of automobiles. That is, the operational function of the radiator grilles for guiding the flow of air to the radiator is not taken into consideration, regrettably, while designing the radiator grilles. Particularly, the above U.S. temperature-controlling system only controls the amount of suction air into the radiator without respect to the arrangement of parts, such as the engine, positioned behind the radiator. In this regard, the above U.S. system has a problem of nonuniform distribution of the radiator's back pressure caused by irregular arrangement of the pans positioned behind the radiator.

Therefore, in the engine area behind the radiator, the air flows at different speeds, thereby increasing the radiator's back pressure while remarkably reducing the suction speed of air into the radiator. In the above state, the cooling effect of the radiator is remarkably reduced.

SUMMARY OF THE INVENTION

It is, therefore, an object of the present invention to provide a device for moving a radiator grille in automobiles in which the above problems can be overcome and which automatically moves the directional control fins of the grille and appropriately controls the flowing direction of air in accordance with a temperature difference on the back surface of the radiator, thereby improving the cooling effect of the radiator.

In order to accomplish the above object, the present invention provides a device for moving a radiator grille in automobiles, comprising: means for sensing a surface temperature of a radiator, the temperature sensing means being arranged in back of the radiator; a radiator grille placed in front of the radiator and provided with a plurality of movable fins for controlling the flowing direction of air guided to the radiator; means for moving the fins in opposite directions thereby controlling the flowing direction of the air; and a control unit operating the fin moving means in response to an output signal from the temperature sensing means.

The fin moving means comprises a step motor which is provided with a worm on its output shaft, and a pinion gear which engages with the worm and is integrated with a rotating axis of one of the directional control fins into a single structure.

The temperature sensing means comprises a plurality of temperature sensors, which are placed in back of the radiator and are spaced out at regular intervals.

In operation of the radiator grille moving device, the temperature sensors sense the temperature difference of the radiator's back surface and output temperature signals to the control unit. Upon receiving the temperature signals, the control unit compares the temperature signals with preset temperature data stored in the memory thereof. Thereafter, the control unit outputs a control signal to the fin moving means. When the control signal from the control unit is applied to the fin moving means, the step motor is rotated in either direction in order to rotate the pinion gear. The directional control fins connected to the pinion gear are thus rotated in a desirable direction thereby guiding the air to the radiator in the desirable direction.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a view showing the construction of the radiator grille moving device of this invention.

DESCRIPTION OF THE PREFERRED EMBODIMENTS

Figure 1:
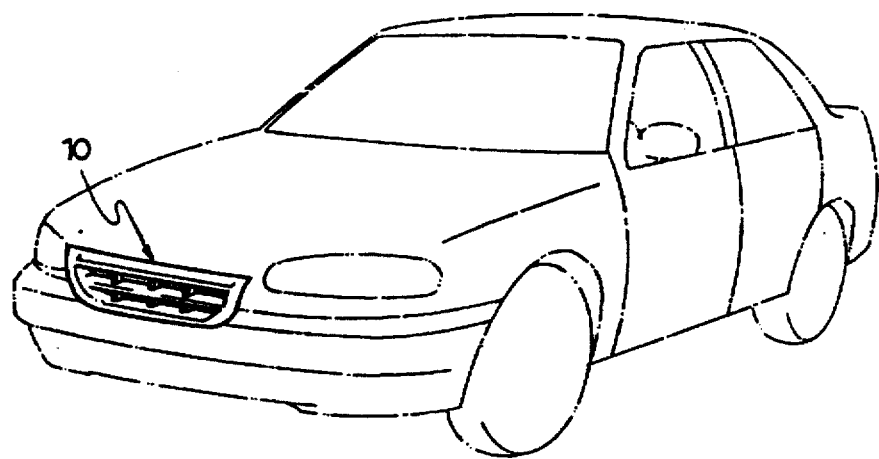
FIG. 1 is a perspective view showing an automobile provided with a typical radiator grille.
Figure 2:
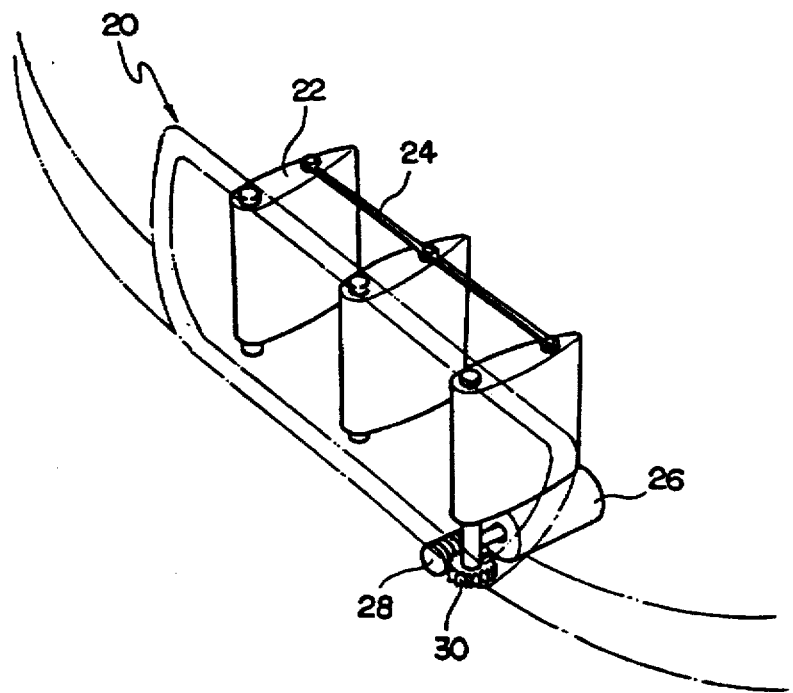
FIG. 2 is a perspective view showing the configuration of a device for moving a radiator grille in accordance with the preferred embodiment of the present invention.

FIG. 2 is a perspective view showing the configuration of a radiator grille moving device in accordance with the preferred embodiment of this invention. FIG. 3 is a view showing the construction of the radiator grille moving device of this invention.

As shown in FIGS. 2 and 3, the radiator grille moving device of this invention includes a radiator grille 20, a radiator 34, and a control unit 32. Arranged in back of the radiator 34 is a sensing means. The sensing means comprises a plurality of temperature sensors 36 which are spaced out at regular intervals. The sensors 36 sense a temperature difference on the surface of the radiator 34 which is cooled by the air.

The radiator grille 20 has a plurality of directional control fins 22, which are coupled together by a link bar 24 and are rotated in opposite directions. The radiator grille 20 also has a fin moving means which moves the fins 22 in order to control the flowing direction of the air guided to the radiator by the fins 22. In the radiator grille 20, it is preferable to vertically arrange the directional control fins 22 inside a grille frame in order to make the fins 22 parallel to each other and spaced out at regular intervals. However, it should be understood that the fins 22 may be horizontally arranged inside the grille frame in accordance with both the grille's configuration and engine's position.

The fin moving means comprises a worm 28, a pinion gear 30 and a step motor 26. In the above fin moving means, the worm 28 is formed on the output shaft of the step motor 26 and gears into the pinion gear 30. The pinion gear 30 is integrated with a rotating axis of a directional control fin 22 into a single structure.

The control unit 32 is connected to both the temperature sensors 36 and the step motor 26, so that the unit 32 drives the fin moving means in response to the temperature signals output from the temperature sensors 36.

In operation of the above radiator grille moving device, air passes through the grille 20 and is guided to the radiator 34. The air in turn passes through the radiator 34. In the above state, the back pressure generated in the engine area behind the radiator 34 is highly increased. When such a high pressure is generated in the engine area, the flowing speed of the air in the radiator 34 is reduced thereby remarkably reducing the cooling effect of the radiator 34. The radiator 34 thus fails to effectively cool the liquid coolant circulating therein, so that the temperature of the radiator 34 is regrettably increased in order to cause a temperature difference in the radiator 34.

The above temperature difference in the radiator 34 is sensed by the sensors 36. The sensors 36 output temperature signals to the control unit 32. Upon receiving the temperature signals from the sensors 36, the control unit 32 compares the input temperature signals with preset temperature data which is stored in the memory of the unit 32. Thereafter, the control unit 32 outputs a control signal to the fin moving means in order to drive the fin moving means in accordance with the comparison results.

Upon receiving the control signal, the step motor 26 of the fin moving means is rotated in either direction. The rotating force of the motor 26 in the above state is transmitted to the pinion gear 30 through the worm 28 thereby rotating the pinion gear 30. As the pinion gear 30 is integrated with the rotating axis of one of the directional control fins 22 into a single structure, the pinion gear 22 rotates the directional control fins 22 of the grille 20 in the same direction thereby controlling the flowing direction of the air guided to the radiator 34. The fins 22 in the above state are moved at the same time because they are coupled together by the link bar 24.

As described above, the present invention provides a device for moving a radiator grille in automobiles. In the device, a plurality of temperature sensors are placed in back of a radiator. The radiator grille has a plurality of directional control fins which are rotatable within a predetermined rotating angle by a fin moving means. The fin moving means is operated under the control of a control unit which outputs a control signal to the fin moving means in response to temperature signals output from the temperature sensors. The fin moving means thus rapidly moves the directional control fins under the control of the control unit in accordance with a temperature difference on the back surface of the radiator, thereby controlling the flowing direction of air guided to the radiator. The radiator grille moving device of this invention improves the cooling effect of the radiator and improves durability of the parts, such as, an engine, arranged in back of the radiator.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for moving components of a radiator grille of a vehicle, comprising:

means for sensing a surface temperature of a radiator, said temperature sensing means being disposed on a back surface of said radiator;

a radiator grille placed in front of said radiator having a plurality of movable fins for guiding the flow of air to the radiator;

means for moving said fins in opposite directions; and a control unit for operating said fin moving means in response to an output signal of the temperature sensing means.

2. The device according to claim 1, wherein said movable fins are arranged in one of a vertical and horizontal orientation, and are coupled together by a link bar.

3. The device according to claim 1, wherein said fin moving means comprise:

a step motor having an output shaft and a worm gear fixed to the output shaft; and a pinion gear engaging the worm gear, said pinion gear being integrally formed with a hinge shaft of one movable fin.

4. A device for moving components of a radiator grille of a vehicle, comprising:

a plurality of temperature sensors for sensing a surface temperature of a radiator, said temperature sensors being disposed on a back surface of said radiator;

a radiator grille placed in front of said radiator having a plurality of movable fins for guiding the flow of air to the radiator;

means for moving said fins in opposite directions; and a control unit for operating said fin moving means in response to an output signal of the temperature sensors.

* * * * *

UNITED STATES PATENT AND TRADEMARK OFFICE
CERTIFICATE OF CORRECTION

PATENT NO. :  5,732,666
DATED       :  March 31, 1998
INVENTORS :  Byung-Cheon Lee It is certified that error appears in the above-identified patent and that said Letters Patent is hereby corrected as shown below:

On the Title Page, Item [57], in the Abstract,
    line 3, "in back" should read --on the rear face--;
    line 6, "is" should read --are--;
    line 9, "moves" should read --move--; and
    line 16, "in back of" should read --behind--.

Signed and Sealed this

Twenty-third Day of June, 1998

*Attest:*

BRUCE LEHMAN

*Attesting Officer*      *Commissioner of Patents and Trademarks*